US012644391B2

(12) United States Patent
Holland

(10) Patent No.: US 12,644,391 B2
(45) Date of Patent: Jun. 2, 2026

(54) METHOD FOR REPAIRING A GAS TURBINE ENGINE COMPONENT

(71) Applicant: RTX CORPORATION, Farmington, CT (US)

(72) Inventor: Brian K. Holland, Mason, MI (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/784,294

(22) Filed: Jul. 25, 2024

(65) Prior Publication Data

US 2026/0028918 A1 Jan. 29, 2026

(51) Int. Cl.
*F01D 9/02* (2006.01)
*F01D 25/00* (2006.01)

(52) U.S. Cl.
CPC ............. *F01D 25/005* (2013.01); *F01D 9/02* (2013.01); *F01D 25/002* (2013.01); *F05D 2220/32* (2013.01); *F05D 2230/72* (2013.01); *F05D 2230/80* (2013.01); *F05D 2230/90* (2013.01); *F05D 2240/12* (2013.01)

(58) Field of Classification Search
CPC ...... F01D 9/02; F01D 25/002; F05D 2230/80; F05D 2230/72; F05D 2230/90; F05D 2240/12
See application file for complete search history.

(56) References Cited

U.S. PATENT DOCUMENTS 7,138,065 B2 11/2006 Czech et al.
9,770,791 B2 9/2017 Hong
11,739,429 B2 8/2023 Mandal et al.
11,739,713 B2 8/2023 Holland et al.
2012/0094099 A1* 4/2012 Hong ........................ B64F 5/40 118/200
2016/0177761 A1* 6/2016 Huizenga ................ F01D 9/047 415/209.3
2017/0369981 A1 12/2017 Srinivasan et al.
(Continued)

FOREIGN PATENT DOCUMENTS

GB 2401115 A 11/2004

OTHER PUBLICATIONS

European Search Report dated Feb. 19, 2026 issued in corresponding application 25191982.5.

*Primary Examiner* — Nathaniel E Wiehe
*Assistant Examiner* — Theodore C Ribadeneyra
(74) *Attorney, Agent, or Firm* — Ross J. Christie; Millen, White, Zelano & Branigan, P.C.

(57) ABSTRACT

A method for repairing a gas turbine engine component, comprising: providing at least one gas turbine engine component comprising a surface area having a portion comprising an aperture including a first size and corrosion; removing the corrosion from the aperture to form an aperture free of corrosion and comprising a second size; treating the aperture free of corrosion and comprising a second size to form an aperture free of corrosion; disposing an amount of at least one anti-corrosion agent on the treated aperture free of corrosion to form an anti-corrosion agent-coated treated aperture free of corrosion; and removing at least a portion of the anti-corrosion agent from the anti-corrosion agent-coated treated aperture free of corrosion to form an aperture free of corrosion comprising the first size and a residual amount of the anti-corrosion agent.

16 Claims, 3 Drawing Sheets

(56) References Cited

U.S. PATENT DOCUMENTS

| | | | | |
|---|---|---|---|---|
| 2018/0223870 | A1* | 8/2018 | Parthasarathy | F01D 25/007 |
| 2020/0024996 | A1* | 1/2020 | Brown | F01D 9/042 |
| 2021/0270150 | A1* | 9/2021 | Lefebvre | F16C 27/04 |

* cited by examiner

METHOD FOR REPAIRING A GAS TURBINE ENGINE COMPONENT

FIELD OF THE INVENTION

The subject matter disclosed herein relates to a method for repair and, in particular, to a method for repairing a gas turbine engine component.

BACKGROUND OF THE INVENTION

In any operating environment in which weather may be a factor, metal-containing parts, components, assemblies, etc. that are or become exposed eventually experience corrosion. In particular, when such metal-containing components, for instance, include parts coupled together whose respective metal compositions are dissimilar, those two dissimilar metals experience galvanic corrosion. In addition, two dissimilar metals also exhibit and possess different properties. Those properties also may influence how, e.g., two different parts interact with each other during use. For instance, under harsh operating conditions, coupling together two parts comprising different materials having different weight profiles, respectively, may accelerate fatigue and may even cause premature failure.

For these reasons, there is a need to improve the connection between parts comprising different materials, e.g., dissimilar metals, so corrosion and premature fatigue can be prevented.

SUMMARY OF THE INVENTION

According to an embodiment of the present disclosure, there is provided a method for repairing a gas turbine engine component, comprising:

- providing at least one gas turbine engine component comprising a surface area having at least one portion comprising a first size and corrosion;
- removing the corrosion from the at least one portion to form at least one portion free of corrosion and comprising a second size;
- treating the at least one portion free of corrosion and comprising a second size to form at least one treated portion free of corrosion;
- disposing an amount of at least one anti-corrosion agent on the at least one treated portion free of corrosion to form at least one anti-corrosion agent-coated treated portion free of corrosion; and
- removing at least a portion of the anti-corrosion agent from the at least one anti-corrosion agent-coated treated portion free of corrosion to form at least one portion free of corrosion comprising the first size and a residual amount of the anti-corrosion agent.

According to another embodiment of the present disclosure, there is provided a gas turbine engine component repaired according to a process comprising the steps of:

- providing at least one gas turbine engine component comprising at least one portion comprising a first size and corrosion;
- removing the corrosion from the at least one portion to form at least one portion free of corrosion and comprising a second size;
- treating the at least one portion free of corrosion and comprising a second size to form at least one treated portion free of corrosion;
- disposing an amount of at least one anti-corrosion agent on the at least one treated portion free of corrosion to form at least one anti-corrosion agent-coated treated portion free of corrosion; and
- removing at least a portion of the anti-corrosion agent from the at least one anti-corrosion agent-coated treated portion free of corrosion to form at least one portion free of corrosion comprising the first size and a residual amount of the anti-corrosion agent.

According to yet another embodiment of the present disclosure, there is provided a gas turbine engine comprising:

- at least one low-pressure compressor assembly comprising at least one vane, the at least one vane repaired according to a method comprising the steps of:
- providing at least one vane comprising a vane base housing having at least one portion comprising a first size and corrosion;
- removing the corrosion from the at least one portion to form at least one portion free of corrosion and comprising a second size;
- treating the at least one portion free of corrosion and comprising a second size to form at least one treated portion free of corrosion;
- disposing an amount of at least one anti-corrosion agent on the at least one treated portion free of corrosion to form at least one anti-corrosion agent-coated treated portion free of corrosion; and
- removing at least a portion of the anti-corrosion agent from the at least one anti-corrosion agent-coated treated portion free of corrosion to form at least one portion free of corrosion comprising the first size and a residual amount of the anti-corrosion agent.

In further embodiments of the present disclosure, including further embodiments of the above exemplary embodiments, the method further comprises inspecting the at least one portion free of corrosion and comprising the first size and the residual amount of the anti-corrosion agent.

In further embodiments of the present disclosure, including further embodiments of the above exemplary embodiments, the at least one portion comprises at least one vane base housing of at least one vane, the at least one vane base housing comprises at least one clip aperture designed to receive at least one clip nut and at least one attachment bolt aperture designed to receive at least one attachment bolt.

In further embodiments of the present disclosure, including further embodiments of the above exemplary embodiments, the at least one vane base housing and the at least one attachment bolt comprise different materials that facilitate a transfer of electrons when the vane base housing and attachment bolt make contact.

In further embodiments of the present disclosure, including further embodiments of the above exemplary embodiments, the at least one vane is located within at least one stage of a low-pressure compressor assembly.

In further embodiments of the present disclosure, including further embodiments of the above exemplary embodiments, the residual amount of the anti-corrosion agent comprises a bushing.

In further embodiments of the present disclosure, including further embodiments of the above exemplary embodiments, the at least one anti-corrosion agent comprises at least one fluoroelastomer.

In further embodiments of the present disclosure, including further embodiments of the above exemplary embodiments, the method further comprises inspecting the at least one portion free of corrosion and comprising the first size and the residual amount of the anti-corrosion agent.

In further embodiments of the present disclosure, including further embodiments of the above exemplary embodiments, the at least one portion comprises at least one vane base housing of at least one vane, the at least one vane base housing comprising at least one clip aperture designed to receive at least one clip nut and at least one attachment bolt aperture designed to receive at least one attachment bolt.

In further embodiments of the present disclosure, including further embodiments of the above exemplary embodiments, the at least one vane base housing and the at least one attachment bolt comprise different materials that facilitate a transfer of electrons when the vane base housing and the attachment bolt make contact.

In further embodiments of the present disclosure, including further embodiments of the above exemplary embodiments, the residual amount of the anti-corrosion agent comprises a bushing.

In further embodiments of the present disclosure, including further embodiments of the above exemplary embodiments, the at least one vane is located within at least one stage of a low-pressure compressor assembly.

In further embodiments of the present disclosure, including further embodiments of the above exemplary embodiments, the at least one anti-corrosion agent comprises at least one fluoroelastomer.

In further embodiments of the present disclosure, including further embodiments of the above exemplary embodiments, the vane base housing comprises at least one clip aperture designed to receive at least one clip nut and at least one attachment bolt aperture designed to receive at least one attachment bolt.

In further embodiments of the present disclosure, including further embodiments of the above exemplary embodiments, the vane base housing and the at least one attachment bolt comprise different materials that facilitate a transfer of electrons when the vane base housing and attachment bolt make contact.

In further embodiments of the present disclosure, including further embodiments of the above exemplary embodiments, the residual amount of the anti-corrosion agent comprises a bushing.

In further embodiments of the present disclosure, including further embodiments of the above exemplary embodiments, at least one anti-corrosion agent comprises at least one fluoroelastomer.

BRIEF DESCRIPTION OF FIGURES

The features of the disclosure believed to be novel and the elements characteristic of the invention are set forth with particularity in the appended claims. The figures are for illustration purposes only and are not drawn to scale. The disclosure itself, however, both as to organization and method of operation, can best be understood by reference to the description of the preferred embodiment(s) which follows, taken in conjunction with the accompanying drawings in which:

DETAILED DESCRIPTION OF THE INVENTION

Figure 1:
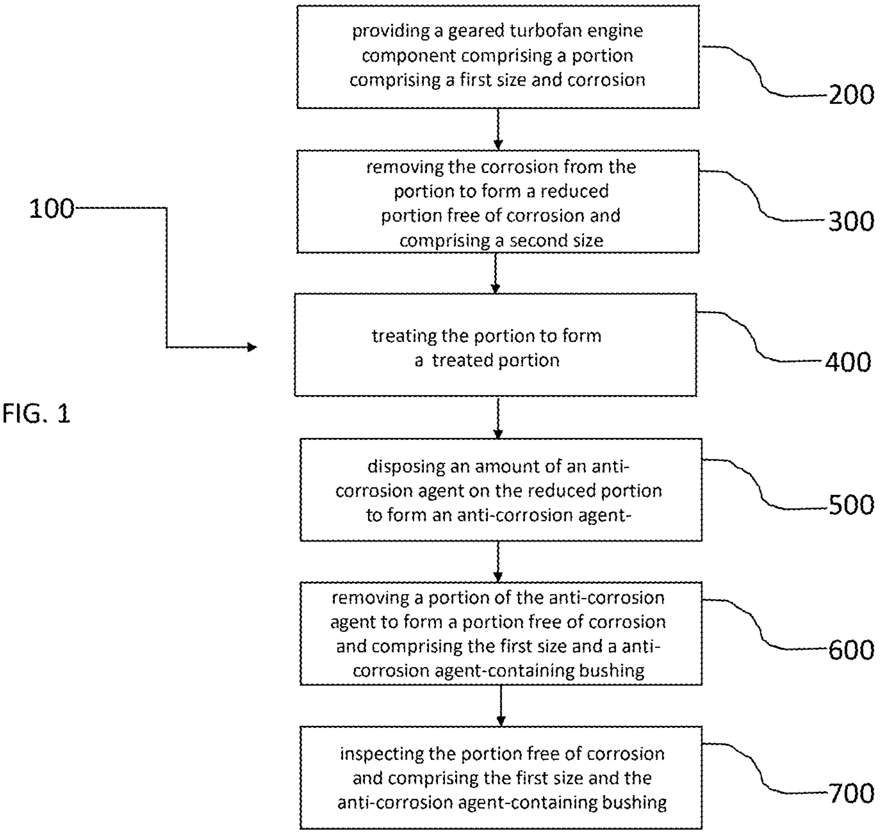
FIG. 1 is a flowchart illustrating an exemplary method for repairing a gas turbine engine component.
Figure 2:
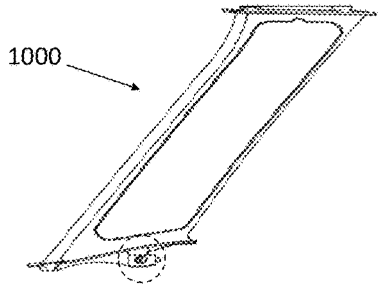
FIG. 2 is an illustration of a gas turbine engine component.
Figure 3:
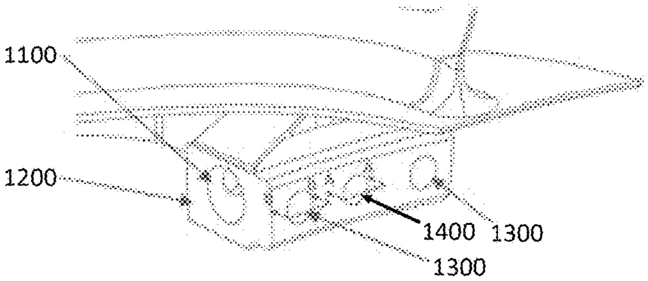
FIG. 3 is an enlarged view of the circled portion of the gas turbine engine component of FIG. 2.

The embodiments of the present disclosure can comprise, consist of, and consist essentially of the features and/or steps described herein, as well as any of the additional or optional ingredients, components, steps, or limitations described herein or would otherwise be appreciated by one of skill in the art. It is to be understood that all concentrations disclosed herein are by weight percent (wt. %.) based on a total weight of the composition unless otherwise indicated.

When considering harsh operating environments and assemblies operating therein, both conditions and assemblies can vary wildly. For instance, an engine in a high-performance vehicle, e.g., a Formula One race car, by virtue of its use operates in a harsh environment and experiences extremes. Likewise, a geared turbofan engine in either a military or commercial aircraft operates in a harsh environment and experiences extremes. In both examples, each assembly contains components having parts possessing different materials, e.g., dissimilar metals, yet coupled together. More specifically, a geared turbofan engine contains various sections, such as a fan exit case and a low-pressure compressor. Both the fan exit case and low-pressure compressor contain, e.g., a structural guide vane comprising aluminum that is secured using, e.g., a steel bolt. As discussed above, whenever two dissimilar metals, like aluminum and steel, contact each other and are exposed to harsh operating conditions, galvanic corrosion may occur such that the aluminum corrodes. In addition, whenever two dissimilar metals having different weight profiles, e.g., aluminum and steel, are secured together, the heavier metal, e.g., steel, may cause distress to the lighter metal, e.g., aluminum. When considering the structural guide vane comprising aluminum that is secured using the steel bolt, the steel bolt may vibrate against the aluminum such that the aluminum experiences high-cycle fatigue. And, high-cycle fatigue may accelerate a part's failure.

The present disclosure is drawn to a method for improving the connection between parts comprising different materials, e.g., dissimilar metals, so corrosion and high-cycle fatigue can be mitigated and/or prevented. Likewise, such an improvement method also constitutes a method for repairing a component whose parts comprise dissimilar metals and corrode and/or suffer high-cycle fatigue. These methods also create repaired parts resistant to further corrosion and/or high-cycle fatigue where their respective dissimilar metals make contact.

For purposes of illustration, and not to be limited thereto, an exemplary method for repairing a component of a geared turbofan engine will be discussed with respect to an exemplary vane assembly for a fan exit case and/or any stage of a, e.g., six stage, low-pressure compressor. In both exemplary geared turbofan engine sections, the operating environments maintain a temperature of less than 400 degrees Celsius and are routinely exposed to moisture, e.g., rainwater. Such an operating environment and exposure to elements leads to the exemplary van assembly to corrode and experience high-cycle fatigue.

Referring now to FIGS. 1-3, 4A and 4B, an exemplary flowchart 100 setting forth an exemplary repair method is illustrated (See FIG. 1). At an exemplary step 200 of FIG. 1, an exemplary geared turbofan engine component is provided. The exemplary geared turbofan engine component comprises a surface area having a portion exhibiting and possessing corrosion. In at least one embodiment, the exemplary geared turbofan engine component may be an exemplary vane assembly 1000 (See FIG. 2). For example, the aforementioned surface area may include a clip aperture 1100 of a vane base housing 1200 that comprises aluminum (See FIG. 3). The clip aperture 1100 may intersect at least one aperture for receiving an attachment bolt, e.g., attachment bolt apertures 1300 (See FIGS. 3 and 4B). Between the attachment bolt apertures 1300, an aperture for receiving a pin, e.g., a pin aperture 1400, may be disposed (See FIGS. 3 and 4A). A clip nut 1500 may be disposed within the clip aperture 1100 and designed to threadingly engage and receive an attachment bolt (not shown) disposed into the attachment bolt aperture 1300 (See FIG. 4B). The clip aperture 1100 may have a first size, e.g., an initial or original diameter, designed to receive a fastening mechanism (not shown), e.g., a steel nut having a flange (not shown), that is disposed therein. Although clip aperture 1100 of FIG. 3 does not exhibit corroded aluminum, a sidewall 1200 of clip aperture 1100 may exhibit corrosion when corrosion is present. Likewise, when clip aperture 1100 experiences high-cycle fatigue (not shown), sidewall 1200 may exhibit distortion such that the size, e.g., diameter, of clip aperture 1100 may be enlarged, distorted, and the like.

Next, at an exemplary step 300 of FIG. 1, a corroded area encompassing at least a portion of the sidewall of clip aperture 1100 may be removed. The machining technique may be any technique capable of removing the corrosion and the corroded area located proximate to the clip aperture of the exemplary vane assembly. Yet, the machining technique will avoid contacting the bottom of the clip aperture 1100. Suitable machining techniques may include, but are not limited to, drilling, milling, electro-discharge machining, combinations comprising at least one of the foregoing techniques, and the like. When drilling or milling techniques are utilized, the "speed to feed" concept may be followed. With respect to "speed", "speed" is the rotations per minute or rpm at which, e.g., a drilling or milling instrument is operated. With respect to "feed", "feed" is the rate at which, e.g., a drilling or milling instrument is inserted into a material. With this knowledge of "speed to feed", the machining technique can be performed so as to not damage the material being acted upon when removing the corrosion and the corroded area. While the exemplary method is described using corroded aluminum as an exemplary material for removal, more complicated corroded materials, such as, but not limited to, a corroded titanium or a corroded superalloy, instead may be repaired. When repairing more complicated corroded materials, "speed to feed" must be considered as the corroded exemplary geared turbofan engine component may overheat and/or the machining instrument, e.g., drilling, milling, and the like, may break. Once the machining technique is performed, the initial or original diameter of clip aperture 1100 increases in size to a new, larger diameter of a resultant drilled clip aperture. Moreover, the resultant drilled clip aperture may be free of corrosion and the corroded area and, in turn, encompass a reduced portion.

Next, at an exemplary step 400 of FIG. 1, a chem film or chemfilm material, e.g., Alodine® commercially available from Henkel AG & Co. KGaA, or a primer, as an alternative, may be disposed upon the portion exhibiting and possessing corrosion, e.g., sidewall of clip aperture 1100. Unlike Alodine®, when utilizing a primer, the disposed primer may be cured prior to completing this step. Once disposed, and cured too if necessary, the Alodine® or primer may protect the aluminum base material. The Alodine® or primer fills whatever pore(s) and/or porosity may be present on the surface of the aluminum. Furthermore, the Alodine® or primer will promote adhesion between the aluminum base material and an anti-corrosion coating material yet to be disposed. The amount of Alodine® or primer disposed may be sufficient to coat the entire sidewall of the drilled clip aperture formerly exhibiting corrosion or the corroded area.

Figure 4B:
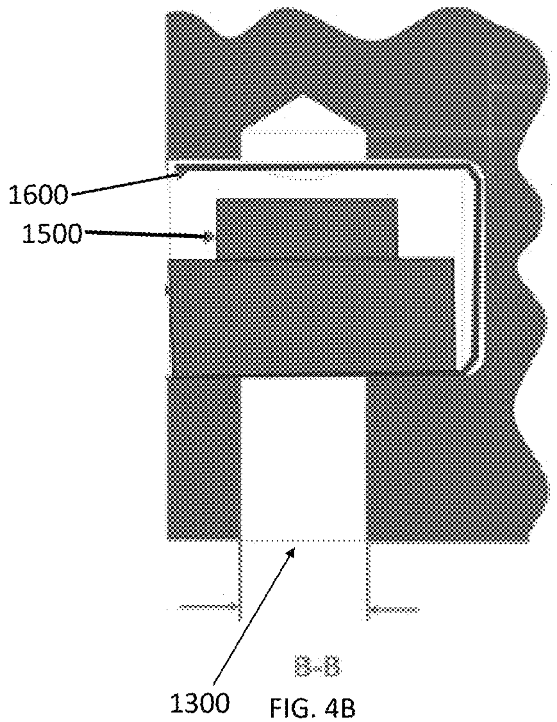
FIG. 4B is a cross-sectional view of area B-B of FIG. 3.
Figure 4A:
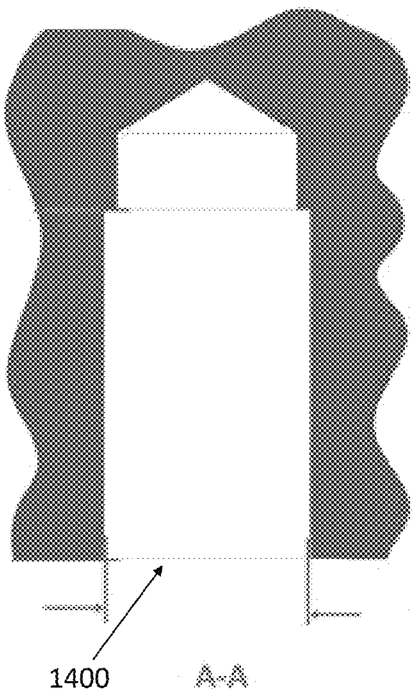
FIG. 4A is a cross-sectional view of area A-A of FIG. 3.

Next, at an exemplary step 500 of FIG. 1, an anti-corrosion agent may be disposed on the drilled clip aperture formerly exhibiting corrosion or the corroded area to form an anti-corrosion agent-containing bushing 1600 (See also FIG. 4B). The anti-corrosion agent may be selected based on the operating environment. For instance, the fan exit case and/or any stage of a, e.g., six stage, low-pressure compressor operate at temperatures reaching up to 400 degrees Celsius. In turn, an anti-corrosion agent for use in such an environment must maintain its integrity. For such operating conditions, suitable anti-corrosion agents may include, but are not limited to, a rubber material, like a fluoroelastomer, e.g., Viton™ Fluoroelastomer commercially available from The Chemours Company, Wilmington, Delaware. In at least one exemplary embodiment, the fluoroelastomer may be disposed in an amount sufficient to coat the area where the Alodine® or primer is applied. More particularly, the fluoroelastomer may be applied in an amount sufficient to decrease the diameter of the drilled, Alodine® or primer coated clip aperture. Under certain circumstances, the resultant anti-corrosion agent-containing bushing 1600 may provide more than benefit than just protection or resistance from corrosion. In at least one exemplary embodiment, the deposited fluoroelastomer bushing also may act as a galvanic separator, a vibrational dampening agent or a combination comprising at least one of the foregoing. For instance, the fluoroelastomer bushing may disrupt the flow of electrons between two dissimilar metals in contact with each other. As discussed earlier, whenever two dissimilar metals, like aluminum and steel, contact each other and are exposed to harsh operating conditions, galvanic corrosion may occur such that the aluminum corrodes. The applied fluoroelastomer bushing can prevent galvanic corrosion between the aluminum and steel parts of the exemplary vane assembly. Also, as the exemplary vane assembly contains aluminum and steel parts in contact with each other, the exemplary vane assembly may experience high-cycle fatigue. In addition, the applied elastomer bushing can act as a vibrational dampening agent. That is, the applied fluoroelastomer bushing 1600 may prevent the steel bolt from vibrating within the aluminum clip aperture. The fluoroelastomer's application alone does not ensure the fluoroelastomer bushing 1600 acts as both an anti-corrosion agent and a vibrational dampening agent. Unless the fluoroelastomer is applied to an entire area, that is, 100% coverage, the fluoroelastomer may only act as a vibrational dampening agent when the coverage is less than 100%. However, when the fluoroelastomer is applied to an entire area, the resultant fluoroelastomer bushing 1600 may act as both an anti-corrosion agent and a vibrational dampening agent. And, as discussed above, when applied to an area encompassing two dissimilar metals, the fluoroelastomer bushing acts as a galvanic separator too. Structurally speaking, the resultant fluoroelastomer bushing 1600 is unlike any other bushing. Other bushings are constructed using steel or brass. In contrast, bushing 1600 is neither a metal nor an alloy. Rather, as mentioned above, bushing 1600 is fabricated using a polymer and, more specifically, a fluoroelastomer, such as Viton™ For this reason, the resultant fluoroelastomer bushing 1600 may exhibit and possess a thickness of approximately one-tenth ($1/10^{th}$) of an inch. In contrast, steel and/or brass-based bushings cannot be fabricated to a thickness of approximately $1/10^{th}$ of an inch.

When carrying out exemplary step 500 of FIG. 1, the anti-corrosion agent may be applied as a liquid or a solid. In at least one embodiment, the fluoroelastomer, e.g., Viton™ Fluoroelastomer, may be applied as a liquid. The application technique may be any technique capable of applying a liquid on a surface. Suitable application techniques may include, but are not limited to, brushing, spraying, combinations comprising at least one of the foregoing, and the like. The liquid Viton™ Fluoroelastomer may be disposed in an amount sufficient to coat the area where the Alodine® or primer is applied, and decrease the diameter of the drilled, Alodine® or primer coated clip aperture. In at least one other embodiment, the fluoroelastomer, e.g., Viton™ Fluoroelastomer, may be applied as a solid, e.g., a flexible Viton™ Fluoroelastomer sheet. The application technique may be any technique capable of applying a flexible Viton™ Fluoroelastomer sheet on a surface. Suitable application techniques may include, but are not limited to, plugging, vacuum bagging, combinations comprising at least one of the foregoing, and the like. When performing either plugging or vacuum bagging, applying pressure to the sheet may be required. Suitable application pressure may be from contact pressure up to approximately 500 pounds per square inch ("psi"). Aside from applying pressure, the surface to be coated by the flexible Viton™ Fluoroelastomer also may require a releasing material, e.g., a release agent, a release film, combinations comprising at least one of the foregoing, and the like, applied thereto. Suitable release agent(s) and/or release film(s) may include, but are not limited to, any material capable of preventing other materials from bonding to the surface to be coated by the flexible Viton™ Fluoroelastomer. When utilizing a liquid fluoroelastomer as the anti-corrosion agent, the fluoroelastomer may be cured. For instance, a liquid Viton™ Fluoroelastomer may cure at a temperature as low as approximately 180 degrees Celsius and a temperature range of approximately 200 degrees Celsius to approximately 300 degrees Celsius. When utilizing a flexible fluoroelastomer sheet, the disposed flexible Viton™ Fluoroelastomer may bond to the surface at operating temperatures above approximately 300 degrees Celsius. For instance, in either the fan exit case or six-stage low-pressure compressor, the flexible Viton™ Fluoroelastomer disposed in the clip aperture of the vane assembly may bond to the surface and form a tight seal between the aluminum and steel metals at operating temperatures of approximately 400 degrees Celsius. Once the anti-corrosion agent coating is applied, the resultant diameter of the coated clip aperture is decreased in size as compared to the diameter of the drilled clip aperture.

As discussed earlier, other, more complicated materials such as titanium and superalloys may be repaired using the exemplary method disclosed herein. Should complicated materials such as titanium and superalloys require repair, and the operating temperatures exceed 400 degrees Celsius, alternate anti-corrosion agents and releasing materials capable of withstanding and performing at such operating temperatures may be utilized instead. The exemplary method disclosed herein may be modified any number of ways in order to repair a variety of materials in a variety of assemblies at a variety of operating environments and temperatures.

Referring again to FIG. 1, at an exemplary step 600 of the exemplary method 100, at least a portion of the coated clip aperture may be removed. The machining technique may be any technique capable of abrading, yet not peeling off, the anti-corrosion agent disposed proximate to and about the clip aperture of the exemplary vane assembly. Suitable machining techniques may include, but are not limited to, drilling, milling, combinations comprising at least one of the foregoing techniques, and the like. For instance, a Dremel® flapper wheel, commercially available from Dremel®, a division of Robert Bosch Tool Corporation, Prospect, Illinois, is a suitable milling tool for use herein. When drilling or milling techniques are utilized, the "speed to feed" concept may be followed. With respect to "speed", "speed" is the rotations per minute or rpm at which, e.g., a drilling or milling instrument is operated. With respect to "feed", "feed" is the rate at which, e.g., a drilling or milling instrument is inserted into a material. With this knowledge of "speed to feed", the removal technique, e.g., drilling, can be performed so as to not damage, e.g., peel off, the anti-corrosion agent, but rather simply abrade the anti-corrosion agent. By abrading the anti-corrosion agent, the resultant finished machined clip aperture may exhibit and possess a residual amount of anti-corrosion agent in the form of bushing 1600 and the clip aperture diameter may be increased in size to its initial or original diameter. By increased in size to its initial or original diameter, the concentricity of the diameter of the exemplary finished machined clip aperture, as well as its smooth, interior surface, may be restored to the clip aperture's original dimensions and appearance, prior to experiencing corrosion, using the resultant bushing 1600.

Lastly, at an exemplary step 700 of FIG. 1, the resultant clip aperture now having its initial or original diameter restored and a residual amount of anti-corrosion agent present, yet no corrosion or corroded area present, may be inspected. Any inspection method capable of detecting corrosion or a corroded area may be utilized. Suitable inspection methods may include, but are not limited to, visual, camera aided, mirror(s), white light, combinations comprising at least one of the foregoing, and the like. Upon confirming the corrosion or corroded area is no longer present, the exemplary vane assembly may be returned to service.

Working Example

TABLE 1

| clip aperture repair stage | diameter (inch) |
|---|---|
| corroded clip aperture | 0.597 |
| drilled clip aperture | 0.601 |
| coated clip aperture | 0.581 |
| finished machined clip aperture | 0.597 |

A structural guide vane for a fan exit case, e.g., PW1500G or PW1900G, was treated according to the exemplary method disclosed herein. The aluminum sidewall of a clip aperture of the structural guide vane exhibited corrosion. An initial or original diameter of the corroded clip aperture was approximately 0.597 inch. The corroded clip aperture was drilled and a portion encompassing the entire corroded area of the sidewall was removed. After drilling and removal took place, the diameter of the drilled clip aperture increased to approximately 0.601 inch. Next, the drilled clip aperture was treated with Alodine®. And, Viton™ was then applied to the treated area of the Alodine® drilled clip aperture. Afterwards, the diameter of the coated clip aperture decreased to approximately 0.581 inch. Next, the coated clip aperture again was drilled and a portion of the Viton™ was removed from the clip aperture to form a Viton™ bushing. The diameter of the finished machined clip aperture increased to approximately 0.597 inch. The resultant diameter of the finished machined clip aperture is the same as the initial or original diameter of the corroded clip aperture of the structural guide vane. However, the equivalence in diameter of the clip aperture from its initial state versus its resultant state reflects the amount of corrosion or corroded area that has been removed and subsequently replaced by the Viton™ bushing.

While the present disclosure has been particularly described, in conjunction with specific preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present disclosure.

What is claimed is:

1. A method for repairing a gas turbine engine component, comprising:

providing at least one gas turbine engine component comprising a surface area having at least one portion comprising at least one aperture including a first size and corrosion;

removing the corrosion from the at least one aperture to form at least one aperture free of corrosion and comprising a second size;

treating the at least one aperture free of corrosion and comprising a second size to form at least one treated aperture free of corrosion;

disposing an amount of at least one anti-corrosion agent on the at least one treated aperture free of corrosion to form at least one anti-corrosion agent-coated treated aperture free of corrosion, the at least one anti-corrosion agent comprising any one or more of the following: rubber, fluoroelastomer, and combinations thereof; and removing at least a portion of the anti-corrosion agent from the at least one anti-corrosion agent-coated treated aperture free of corrosion to form at least one aperture free of corrosion comprising the first size and a residual amount of the anti-corrosion agent.

2. The method according to claim 1, further comprising inspecting the at least one aperture free of corrosion and comprising the first size and the residual amount of the anti-corrosion agent.

3. The method according to claim 1, wherein the at least one portion comprises at least one vane base housing of at least one vane, the at least one vane base housing comprises at least one clip aperture designed to receive at least one clip nut and at least one attachment bolt aperture designed to receive at least one attachment bolt.

4. The method according to claim 3, wherein the at least one vane base housing and the at least one attachment bolt comprise different materials that facilitate a transfer of electrons when the vane base housing and attachment bolt make contact.

5. The method according to claim 3, wherein the at least one vane is located within at least one stage of a low-pressure compressor assembly.

6. The method according to claim 1, wherein the residual amount of the anti-corrosion agent comprises a bushing.

7. A gas turbine engine component repaired according to a process comprising the steps of:

providing at least one gas turbine engine component comprising at least one portion comprising at least one aperture including a first size and corrosion;

removing the corrosion from the at least one aperture to form at least one aperture free of corrosion and comprising a second size;

treating the at least one aperture free of corrosion and comprising a second size to form at least one treated aperture free of corrosion;

disposing an amount of at least one anti-corrosion agent on the at least one treated aperture free of corrosion to form at least one anti-corrosion agent-coated treated aperture free of corrosion, the at least one anti-corrosion agent comprising any one or more of the following: rubber, fluoroelastomer, and combinations thereof; and removing at least a portion of the anti-corrosion agent from the at least one anti-corrosion agent-coated treated aperture free of corrosion to form at least one aperture free of corrosion comprising the first size and a residual amount of the anti-corrosion agent.

8. The gas turbine engine component according to claim 7, further comprising inspecting the at least one aperture free of corrosion and comprising the first size and the residual amount of the anti-corrosion agent.

9. The gas turbine engine component according to claim 7, wherein the at least one portion comprises at least one vane base housing of at least one vane, the at least one vane base housing comprising at least one clip aperture designed to receive at least one clip nut and at least one attachment bolt aperture designed to receive at least one attachment bolt.

10. The gas turbine engine component according to claim 9, wherein the at least one vane base housing and the at least one attachment bolt comprise different materials that facilitate a transfer of electrons when the vane base housing and the attachment bolt make contact.

11. The gas turbine engine component according to claim 7, wherein the residual amount of the anti-corrosion agent comprises a bushing.

12. The gas turbine engine component according to claim 7, wherein the at least one vane is located within at least one stage of a low-pressure compressor assembly.

13. A gas turbine engine comprising:

at least one low-pressure compressor assembly comprising at least one vane, the at least one vane repaired according to a method comprising the steps of:

providing at least one vane comprising a vane base housing having at least one portion comprising at least one attachment bolt aperture including a first size and corrosion;

removing the corrosion from the at least one attachment bolt aperture to form at least one portion free of corrosion and comprising a second size;

treating the at least one attachment bolt aperture free of corrosion and comprising a second size to form at least one treated attachment bolt aperture free of corrosion;

disposing an amount of at least one anti-corrosion agent on the at least one treated attachment bolt aperture free of corrosion to form at least one anti-corrosion agent-coated treated attachment bolt aperture free of corrosion, the at least one anti-corrosion agent comprising any one or more of the following: rubber, fluoroelastomer, and combinations thereof; and removing at least a portion of the anti-corrosion agent from the at least one anti-corrosion agent-coated treated attachment bolt aperture free of corrosion to form at least one attachment bolt aperture free of corrosion comprising the first size and a residual amount of the anti-corrosion agent.

14. The gas turbine engine according to claim 13, wherein the vane base housing comprises at least one clip aperture designed to receive at least one clip nut and the at least one attachment bolt aperture designed to receive at least one attachment bolt.

15. The gas turbine engine according to claim 14, wherein the vane base housing and the at least one attachment bolt comprise different materials that facilitate a transfer of electrons when the vane base housing and attachment bolt make contact.

16. The gas turbine engine according to claim 13, wherein the residual amount of the anti-corrosion agent comprises a bushing.

* * * * *